United States Patent
Gao et al.

(10) Patent No.: US 11,182,369 B2
(45) Date of Patent: *Nov. 23, 2021

(54) ACCESSING DATA IN A MULTI-LEVEL DISPLAY FOR LARGE DATA SETS

(71) Applicant: International Business Machines Corporation, Armonk, NY (US)

(72) Inventors: Xiaoyang Gao, San Jose, CA (US); William S. Spangler, San Martin, CA (US); Sheng Hua Bao, San Jose, CA (US); Yanyan Han, San Jose, CA (US); Brian S. Dreher, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/961,248

(22) Filed: Apr. 24, 2018

(65) Prior Publication Data

US 2019/0325047 A1    Oct. 24, 2019

(51) Int. Cl.
*G06F 16/22* (2019.01)
*G06F 16/23* (2019.01)
*G06F 40/18* (2020.01)

(52) U.S. Cl.
CPC ...... *G06F 16/2282* (2019.01); *G06F 16/2264* (2019.01); *G06F 16/2379* (2019.01); *G06F 40/18* (2020.01)

(58) Field of Classification Search
CPC ............. G06F 16/2282; G06F 16/2264; G06F 16/2379; G06F 40/18; G06F 16/283
See application file for complete search history.

(56) References Cited

U.S. PATENT DOCUMENTS

| 8,489,622 B2 * | 7/2013 | Joshi ................... G06F 16/2477 707/754 |
| 8,768,916 B1 | 7/2014 | Ghazal |

(Continued)

OTHER PUBLICATIONS

List of IBM Patents or Patent Applications Treated as Related, filed Jun. 24, 2019.

(Continued)

*Primary Examiner* — Ashish Thomas
*Assistant Examiner* — Yohanes D Kelemework
(74) *Attorney, Agent, or Firm* — Will Stock; Edell, Shapiro & Finnan, LLC

(57) ABSTRACT

Methods, systems and computer readable media are provided for accessing data utilizing a multi-level table comprising generating a plurality of levels of the multi-level table, wherein a first level of the multi-level table includes a hyper-table with a plurality of hyper-cells each hyper-cell including information for a group of cells from an initial base table, wherein intermediate levels of the multi-level table each include a plurality of hyper-tables comprising hyper-cells with each hyper-table linked to and providing information for a corresponding hyper-cell of a hyper-table of a prior level, and wherein a plurality of tables of a terminal level includes information from cells of the initial base table with each table linked to and providing information for a corresponding hyper-cell. Data from the multi-level table is accessed by traversing links between the hyper-tables of the plurality of levels to access data within the tables of the terminal level.

16 Claims, 12 Drawing Sheets

(56) References Cited

U.S. PATENT DOCUMENTS

| | | |
|---|---|---|
| 8,972,460 B2 | 3/2015 | Das |
| 9,015,572 B2 | 4/2015 | Lanza et al. |
| 9,715,487 B2 | 7/2017 | Rapp |
| 9,734,170 B2 | 8/2017 | Attaluri et al. |
| 9,740,714 B2 | 8/2017 | Attaluri et al. |
| 9,740,721 B2 | 8/2017 | Konik et al. |
| 2012/0030246 A1 | 2/2012 | Herrnstadt |
| 2013/0080393 A1* | 3/2013 | Bird .............. G06F 16/219 707/649 |
| 2015/0310073 A1 | 10/2015 | Chakrabarti et al. |
| 2017/0075965 A1 | 3/2017 | Liu et al. |
| 2017/0091166 A1 | 3/2017 | Greenwood |
| 2017/0147551 A1 | 5/2017 | Kalisz et al. |
| 2017/0177888 A1 | 6/2017 | Arora et al. |
| 2017/0315978 A1 | 11/2017 | Boucher et al. |
| 2018/0067976 A1* | 3/2018 | Schoppe ............ G06F 40/18 |
| 2019/0138658 A1* | 5/2019 | Mathur ............ G06F 16/27 |
| 2019/0324957 A1 | 10/2019 | Gao et al. |

OTHER PUBLICATIONS

Gupta et al.; "Table Filling Multi-Task . . . Joint Entity and Relation Extraction", Proceedings of COLING'16, 26th Inter. Conf. on, Dec. 11-17, 2016, pp. 2537-2547.

Wang et al.; "Automatic Table Ground Truth Generation . . . Table Structure Extraction Method", IEEE 6th International Conference on, Sep. 13, 2001, pp. 528-532.

Zhang et al.; "EntiTables: Smart Assistance for Entity-Focused Tables", SIGIR'17 ACM 40th International Conference on, Aug. 7-11, 2017, pp. 255-264.

Liu et al.; "Network-Based Visual Analysis of Tabular Data", VAST IEEE Conference on, Oct. 23-28, 2011, pp. 41-50.

* cited by examiner

| Name | Documents | SOX9 | TCF7L1 | SMAD4 | PIK3CA | KRAS |
|---|---|---|---|---|---|---|
| A1BG | 665 | 0 | 0 | 0 | 0 | 1 |
| A2M | 4471 | 1 | 0 | 0 | 0 | 4 |
| A2ML1 | 19 | 0 | 0 | 0 | 0 | 1 |
| AADAT | 194 | 1 | 0 | 0 | 0 | 0 |
| AARS | 441 | 0 | 0 | 0 | 1 | 0 |
| AARS2 | 212 | 1 | 0 | 0 | 1 | 0 |
| AAVS1 | 1935 | 0 | 0 | 1 | 0 | 0 |
| ABCA1 | 3149 | 0 | 0 | 0 | 0 | 3 |
| ABCA13 | 23 | 0 | 0 | 0 | 1 | 0 |
| ABCA4 | 2429 | 0 | 0 | 0 | 1 | 0 |
| ABCA5 | 30 | 1 | 0 | 0 | 1 | 0 |
|  | 12778 | 3587 | 79 | 3739 | 4599 | 22 |
|  | 27423868 |  |  |  |  | 19015 |

FIG.2A

| Name | Documents | L-VALINOL | INDOXYLSI | 1-ANILINO- | CILAZAPRI | HYMECROI | C... |
|---|---|---|---|---|---|---|---|
| A1BG | 665 | 0 | 0 | 0 | 0 | 0 | 0 |
| A2M | 4471 | 0 | 0 | 0 | 0 | 0 | 0 |
| A4GALT | 369 | 0 | 0 | 0 | 0 | 0 | 0 |
| AA1 | 261 | 0 | 0 | 0 | 0 | 0 | 0 |
| AACS | 75 | 0 | 0 | 0 | 0 | 0 | 0 |
| AADAC | 53 | 0 | 0 | 0 | 0 | 0 | 0 |
| AADAT | 194 | 0 | 0 | 0 | 0 | 0 | 0 |
| AAGAB | 441 |  |  |  |  |  |  |
|  | 27423868 | 26 | 37 | 1055 | 549 | 890 | 319 |

FIG.2B

| Name | Documents | KRAS ▼ | ATM | PIK3CA | SMAD4 | SOX9 | TCF7L1 |
|---|---|---|---|---|---|---|---|
| HEPATITIS NOS | 2534 | 2494 | 22 | 5 | 17 | 2 | 0 |
| METASTASES | 2436 | 1740 | 104 | 419 | 341 | 65 | 2 |
| LESIONS | 1884 | 1261 | 313 | 180 | 176 | 85 | 0 |
| DIARRHEA | 367 | 340 | 5 | 33 | 1 | 2 | 0 |
| PANCREAS ADIPOS... | 294 | 266 | 5 | 4 | 33 | 12 | 0 |
| FEVER | 230 | 209 | 10 | 2 | 5 | 0 | 0 |
| GROWTH INHIBITION | 387 | 181 | 54 | 62 | 99 | 5 | 1 |
| FATIGUE | 211 | 178 | 7 | 34 | 2 | 1 | 0 |
| ASPIRATION | 173 | 156 | 5 | 11 | 17 | 4 | 0 |
| PROSTATE | 456 | 155 | 127 | 69 | 73 | 40 | 1 |
| BRAIN INFLAMMATI... | 160 | 153 | 2 | 5 | 0 | 0 | 0 |
| | 140 | 136 | 1 | 8 | 1 | 0 | 0 |
| | 34603 | 7733 | 3343 | 1170 | 1154 | 735 | 5 |

BASE TABLE 410

FIG. 4A

BASE TABLE 420

| | PROTEIN KINASE MOLECULE 1 | PROTEIN KINASE MOLECULE 2 | LIPASE MOLECULE 3 | LIPASE MOLECULE 4 | MOLECULE 5 | MOLECULE 6 |
|---|---|---|---|---|---|---|
| HIGH BLOOD PRESSURE | 12 | 1 | 0 | 4 | 0 | 0 |
| ATHEROSCLEROSIS | 4 | 16 | 5 | 3 | 0 | 0 |
| HIGH CHOLESTEROL | 5 | 11 | 47 | 41 | 0 | 0 |
| HIGH TRIGLYCERIDES | 18 | 9 | 5 | 84 | 0 | 0 |
| DIABETES | 25 | 172 | 2 | 125 | 0 | 0 |
| CARDIAC MYOPATHY | 24 | 541 | 4 | 12 | 0 | 0 |
| PANCREATITIS | 0 | 0 | 0 | 0 | 0 | 0 |

HYPER-TABLE 430

| | PROTEIN KINASE | LIPASE |
|---|---|---|
| CARDIAC DISEASE SYMPTOMS | 76 | 189 |
| DIABETES DISEASE SYMPTOMS | 952 | 143 |

FIG. 4B

SIMILARITY SCORES FOR COLUMN ENTITIES

| Entity | Similarity Score ▼ |
|---|---|
| 1 ● KRAS | 0.06245 |
| 2 ● ATM | 0.06245 |
| 3 ● PIK3CA | 0.06245 |
| 4 ● SMAD4 | 0.05805 |
| 5 ● SOX9 | 0.05805 |
| 6 ● TCF7L1 | 0.00957 |

440

MERGE COLUMNS WITH THE SAME SIMILARITY SCORE INTO ONE HYPER-CELL

| Name ▲ | Documents | KRAS OR ATM OR PIK3CA | SMAD4 OR SOX9 | TCF7L1 |
|---|---|---|---|---|
| A2M | 4471 | 1 | 1 | 0 |
| A2ML1 | 19 | 1 | 0 | 0 |
| AADAT | 194 | 0 | 1 | 0 |
| AAGAB | 441 | 1 | 0 | 0 |
| AATF | 258 | 7 | 0 | 0 |

HYPER-TABLE 450

FIG.4C

ACCESSING DATA IN A MULTI-LEVEL DISPLAY FOR LARGE DATA SETS

BACKGROUND

1. Technical Field

Present invention embodiments relate to accessing large sets of data, and more specifically, to generating multi-level tables to facilitate access and interpretation of large data sets.

2. Discussion of the Related Art

In recent years, advances in computing and artificial intelligence have enabled routine ingestion of large data sets. While numerous types of systems are able to ingest large data sets, analyzing the information and presenting the information to the user in a way that enables interpretation is difficult.

If a system returns a data set of a thousand or a million entries, this data set is too large and cumbersome for a user to interpret. For example, a table with a thousand rows and a thousand columns leads to generation of a table with a million cells. Limiting the number of rows or columns to a smaller value, such as one hundred rows and one hundred columns still leads to a table with a thousand entries that is too large for a user to interpret.

Accordingly, to identify high frequency correlations within a large table, a user needs to review the entire table, a process that is both error prone and time consuming.

SUMMARY

According to embodiments of the present invention, methods, systems and computer readable media for accessing data utilizing a multi-level table are provided. A plurality of levels of the multi-level table are generated, wherein a first level of the multi-level table includes a hyper-table with a plurality of hyper-cells, each hyper-cell including information for a group of cells from an initial base table. Intermediate levels of the multi-level table may each include a plurality of hyper-tables comprising hyper-cells with each hyper-table linked to and providing information for a corresponding hyper-cell of a table of a prior level. A plurality of tables of a terminal level includes information from cells of the initial base table, with each table linked to and providing information for a corresponding hyper-cell. Data from the multi-level table may be accessed by traversing links between the hyper-tables of the plurality of levels to access data within the tables of the terminal level.

In some aspects, the first level or top level of the multi-level table may comprise a hyper-table with at least one hyper-cell including information for a group of cells from an initial base table, in which the hyper-cell may be linked to one or more intermediate levels of the multi-level table. The one or more intermediate levels of the multi-table may each comprise at least one hyper-table linked to and providing information for a corresponding hyper-cell of a hyper-table of a prior level. At least one table of a terminal level includes information from cells of the initial base table with the at least one table linked to and providing information for a corresponding hyper-cell.

The multi-level tables as provided herein allow for characterization of large sets of data in a concise, accessible format. Rather than scrolling though large spreadsheets with millions of cell entries to identify relevant data, the characteristics of the data set are summarized at multiple levels (e.g., intermediate levels and terminal levels) of the multi-level table. By using a hyper-table comprising groups of cells (hyper-cells), the bulk characteristics of the data set are captured in a compact, accessible format. For example, hyper-cells at the top level of a multi-level table may have a value of '0' indicating that the underlying data, linked through one or more levels of the hyper-table, do not have substantial correlations. These hyper-cells would not need to be further reviewed by a user. In other optional aspects, each hyper-table of the first and intermediate levels of the multi-level table includes a desired size less than a size of the initial base table and each table of the terminal level includes a size less than the size of a linked hyper-table of the prior level. Accordingly, the size of the table of the first level and intermediate levels may be a fraction of the size of the original base table, greatly improving accessibility of the data.

In other optional aspects, each cell of the initial base table includes information pertaining to co-occurrence of entities of an associated row and column within the same documents.

In other optional aspects, each cell of the initial base table includes information pertaining to entities, and a plurality of levels is generated by sorting the cells of the initial base table based on the entity information and grouping adjacent sorted cells of the initial base table to form a corresponding hyper-cell of a hyper-table of a prior level.

In other optional aspects, the cells are sorted based on frequency of co-occurrence of a first entity and a second entity, wherein the frequency of co-occurrence is a measure of a number of documents among a population of documents having the first entity and the second entity within the same document.

For two entities having a high correlation, the hyper-cell comprising these two entities may also have a large value, indicating that the underlying data has a high correlation. Thus, a user would not need to review the entire table in order to locate data of interest.

Grouping techniques are presented which improve the characteristics of the data at the top level. For example, ordering cells of the base table to ensure that cells having high correlations are adjacent to each other ensures that the corresponding hyper-cell value will be higher than groups of cells without high correlations.

In other optional aspects, each cell of the initial base table includes information pertaining to entities, and a plurality of levels are generated by grouping cells of the initial base table for a corresponding hyper-cell of the table of the first level, based on ontologies associated with the entities pertaining to those cells.

In other optional aspects, the ontology is a hierarchical ontology, and the cells of the base table are grouped into one or more hyper-cells according to a level of the hierarchical ontology. In some aspects, new relationships are identified between groups of entities based upon the grouping.

Entities of the base table may be sorted into categories based on an ontology and grouped into hyper-cells based on these categories. This may allow new relationships between categories of entities to be discovered that would not be apparent from review of the base table data. In some cases, categorization may occur in a hierarchical manner using a hierarchical ontology, and within any given level of the multi-level table, hyper-cells corresponding to a category of the hierarchical ontology may be analyzed to discover novel relationships between categories of entities at that level.

In other optional aspects, each cell of the initial base table includes information pertaining to entities, and a plurality of levels are generated further comprising grouping cells of the initial base table for a corresponding hyper-cell of the table of the first level, based on one or more measures of similarity of entities pertaining to those cells.

In other aspects, multiple similarity measures are provided, allowing identification of relationships between groups of entities, based upon the grouping of the entities by a weighted combination of the similarity measures.

In still other optional aspects, cells may be grouped according to one or more similarity metrics. This type of grouping may reveal relationships between entities that may appear unrelated within the context of the large data set.

In other optional aspects, novel relationships between a first entity and a second entity may be identified based on the grouping of the multi-level table.

According to aspects of the present invention, large data sets may be combined according to various techniques, e.g., co-occurrence frequency sorting, ontology, similarity, etc. or any combination thereof, to facilitate access of the large data set to a user. Using multi-level tables, the entire large data set becomes accessible by a user, and in some cases, novel relationships between entities may be discovered. Present techniques provide for efficient access and display of the large data set, such that a user can access pertinent data and identify relationships among entities without parsing through the entire large data set, which may be millions of entries or more. By grouping entities based on various techniques, relationships between groups of data may be revealed, e.g., relationships that would not be apparent from reviewing the data set presented as a base table (in an ungrouped format).

The relationship between the data of the base table and the grouped data of the multi-level table is maintained, so that the user can reversibly expand or contract access and display of the grouped data, e.g., to expand hyper-cells into underlying grouped data, or vice-versa. The underlying characteristics of the data are preserved, so that the user may access ungrouped data by navigating through the one or more levels of the multi-level table.

In other optional aspects, the user may customize the display of the data, e.g., establishing the size of an intermediate and/or base level, based on the particular application.

Accordingly, multi-level tables provide a variety of advantages, including: characterizing a large set of data at a top level in an accessible, compact form; uncovering novel relationships between categories of entities; and uncovering novel relationships between entities.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

FIGS. 2A and 2B are illustrations of large data sets suitable for incorporation into multi-level tables in accordance with embodiments of the present disclosure.

FIG. 4A is a graphical illustration showing frequency sorting for grouping cells to be displayed in a multi-level table in accordance with embodiments of the present disclosure.

FIG. 4B is a graphical illustration showing ontology sorting for grouping cells to be displayed in a multi-level table in accordance with embodiments of the present disclosure.

FIG. 4C is a graphical illustration showing similarity sorting for grouping cells to be displayed in a multi-level table in accordance with embodiments of the present disclosure.

DETAILED DESCRIPTION

Accessing data in large data sets is difficult, time-consuming, and error prone. Accordingly, the problem to be solved may be characterized as accessibility and analysis of large sets of data. Thus, the multi-level tables of embodiments of the present invention provide a variety of technical features allowing for representation and characterization of large sets of data in a concise, accessible format.

Technical features include efficiently accessing specific information in a large data set without traversing through the entire table. The characteristics of the data are summarized at multiple levels (top and intermediate) of the multi-level table. For example, for numerical data, groups of cells (hyper-cells) may represent the summation, average, median or any other suitable parameter which corresponds to the bulk characteristics of the corresponding group of cells. In some aspects, a hyper-cell is a transformation of the underlying data of a group of base cells to generate a bulk characteristic. Additionally, with this technique, the underlying base cell data is maintained, and therefore, there is no data loss. Thus, a user may comprehend though the multi-level table, the bulk characteristics of the data, while being able to efficiently access the underlying base table data. Additionally, based on grouping of the cells using techniques such as high frequency correlation, ontology, or similarity metrics, novel relationships in the underlying data may be discovered.

Figure 1:
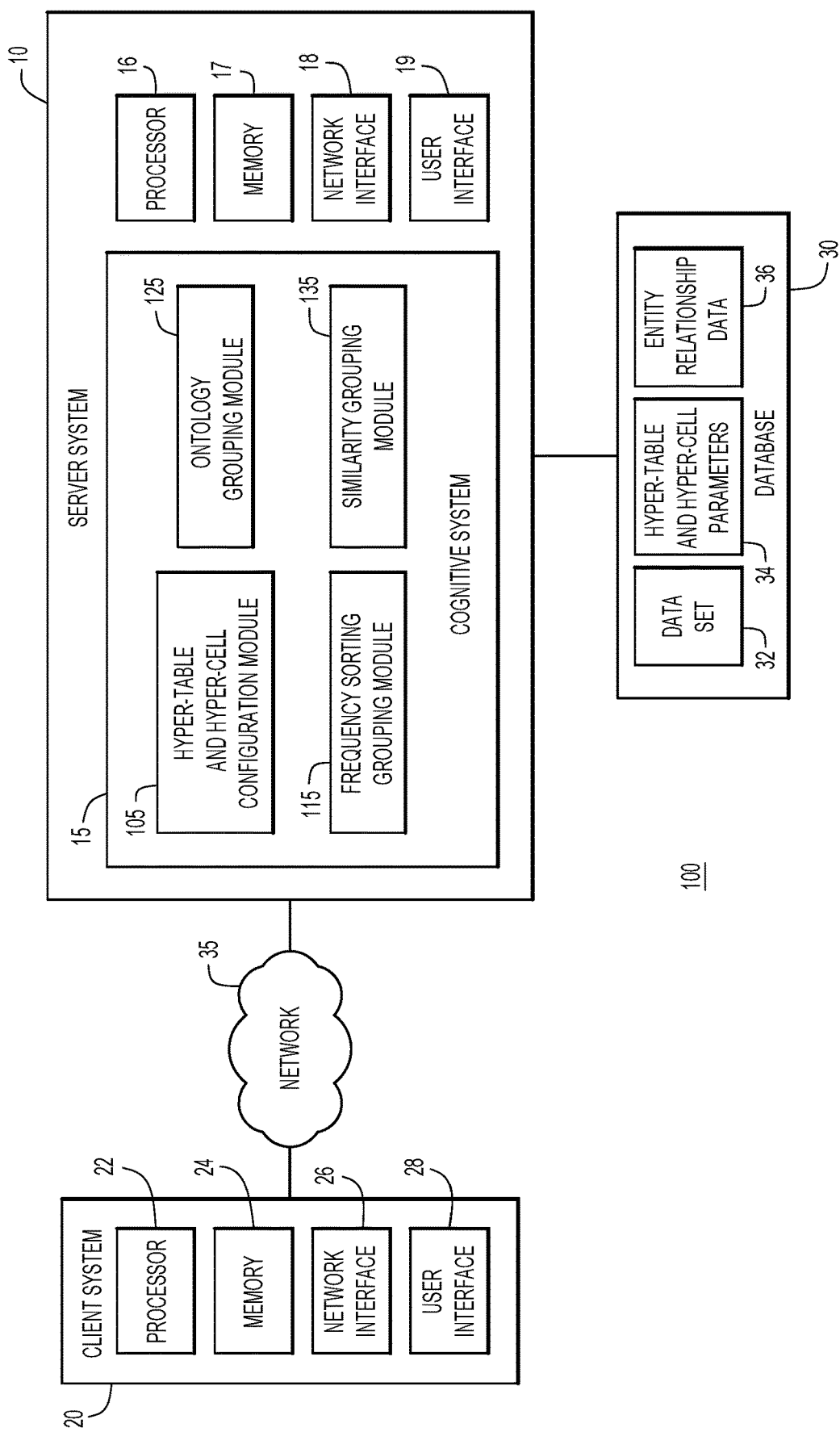
FIG. 1 is a block diagram of an example computing environment for generating and displaying multi-level tables in accordance with embodiments of the present disclosure.

An example environment for use with present invention embodiments is illustrated in FIG. 1. Specifically, the environment 100 includes one or more server systems 10 and one or more client or end-user systems 20. Server systems 10 and client systems 20 may be remote from each other and may communicate over a network 35. The network may be implemented by any number of any suitable communications media (e.g., wide area network (WAN), local area network (LAN), Internet, Intranet, etc.). Alternatively, server systems 10 and client systems 20 may be local to each other, and communicate via any appropriate local communication medium (e.g., local area network (LAN), hardwire, wireless link, Intranet, etc.).

Client systems 20 enable users to analyze large sets of data (e.g., data from documents, etc.) to determine relationships between entities (e.g., documents comprising medical information, biological information, chemical and scientific information, etc.). Server systems 10 may generate multi-level tables to present large sets of data to a user via client system 20. The server systems include a cognitive system 15, which comprises various modules to group data and generate a multi-level table.

A database system 30 may store various information for the analysis (e.g., the data set 32, hyper-table and hyper-cell parameters 34 governing grouping of cells and rows and columns of hyper-tables, entity relationship data 36 identified from the multi-level table, etc.). The database system may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and analysis (e.g., parameters for generation of multi-level tables), and may provide reports including analysis results (e.g., multi-level tables comprising hyper-cells and hyper-tables that show relationships between entities, etc.).

Server systems 10 and client systems 20 may be implemented by any conventional or other computer systems preferably equipped with a display or monitor, a base (e.g., including at least one processor 16, 22 one or more memories 17, 24 and/or internal or external network interfaces or communications devices 18, 26 (e.g., modem, network cards, etc.)), optional input devices or user interfaces 19, 28 (e.g., a keyboard, mouse or other input device), and any commercially available and custom software (e.g., server/communications software, cognitive system 15 software, etc.).

Alternatively, one or more client systems 20 may generate multi-level tables when operating as a stand-alone unit. In a stand-alone mode of operation, the client system stores or has access to the data (e.g., data set 32, hyper-table and hyper-cell parameters 34 provided by the user, entity relationship data 36, etc.), and includes a cognitive system 15 to generate multi-level tables. The graphical user (e.g., GUI, etc.) or other interface (e.g., command line prompts, menu screens, etc.) solicits information from a corresponding user pertaining to the desired analysis, and may provide multi-level tables based on the data grouping techniques provided herein.

Cognitive system 15 may include one or more modules or units to perform the various functions of present invention embodiments described below. The various modules (e.g., hyper-table and hyper-cell configuration module 105, sorting grouping module 115, ontology grouping module 125, and similarity grouping module 135, etc.) may be implemented by any combination of any quantity of software and/or hardware modules or units, and may reside within memory 17 of the server and/or client systems for execution by processor 16. Hyper-table and hyper-cell configuration module 105 generates multi-level tables, e.g., by combining cells in the base-table set to generate one or more hyper-tables of a suitable size, e.g., based on parameters from a user. A hyper-cell comprises a value or other entry that corresponds to a grouping of cells of the base-table and is linked to the other cells. Selection of a hyper-cell may display a table comprising additional hyper-cells or the corresponding cells of the base table. A hyper-table, which may be referred to as a level, comprises a value or other entry that corresponds to at least one hyper-cell.

Frequency sorting grouping module 115 may sort data based upon a frequency of co-occurrence among entities to identify reoccurring relationships among the data, e.g., high frequency relationships. Ontology grouping module 125 may categorize entities, and in some cases, in a hierarchical manner, allowing entities to be combined into groups, and in some cases, a hierarchy of groups. Similarity grouping module 135 may identify entities that may be combined into groups based upon one or more measures of similarity, e.g., provided by another module of a cognitive system (not shown). These modules are described in additional detail below, and with reference to the figures.

FIG. 2A shows an example of a large data set in which each entity of a row and each entity of a column are displayed as a single level table showing all data present in the table. For a thousand input entities, a table of a million cells is generated. For large data sets, this arrangement of data is difficult for a user to interpret. In this example table, a row corresponds to an input entity that is a name of a molecule (e.g., A1BG, A2M, etc.), and a column corresponds to an input entity that is a name of a molecule (e.g., SOX9, TCF7L1, etc.), with the second column indicating a total number of documents in which the corresponding row entity is located. The value of an individual table cell represents a total number of documents in which both the row entity and the column entity are found. For example, a value of '4' indicates that of the 4,471 documents containing the name of the molecule 'A2M', four documents also contained the name of the molecule 'KRAS'.

FIG. 2B shows another example of a large data set in which each entity of a row (e.g., A1BG, A2M, etc.) and each entity of a column (e.g., L-VALINOL, etc.) is displayed as a single level table. While the number of input entities may be limited to a hundred entities, the data is still difficult for a user to interpret. Additionally, the displayed data includes numerous individual cell entries that are zero, indicating that there are no documents having an entity from the respective row and column in the same document. This arrangement may further complicate analysis as the user has to scroll through the document to identify non-zero entries.

Figure 3A:
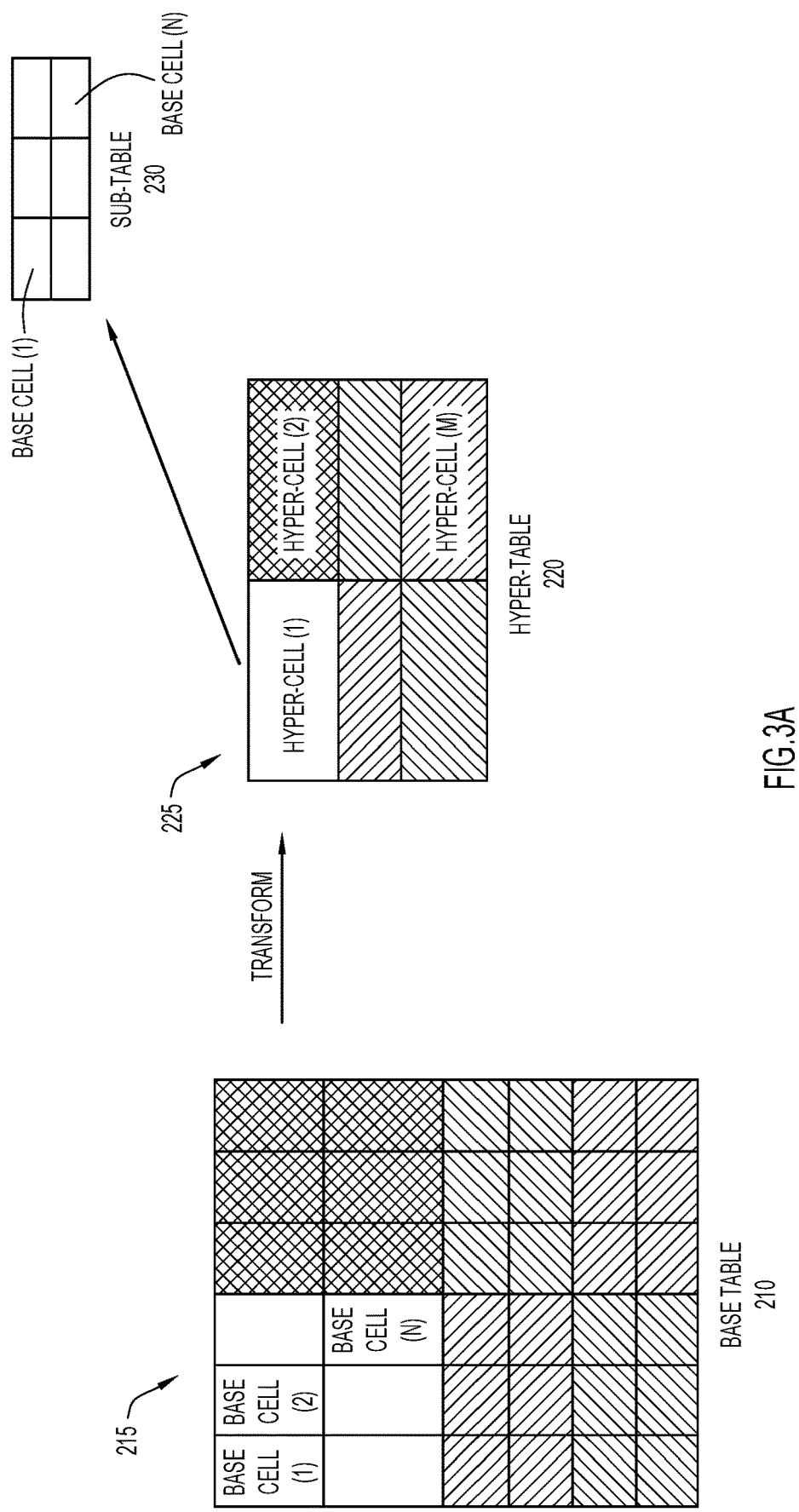
FIGS. 3A-3C are graphical illustrations of generating a multi-level table in accordance with embodiments of the present disclosure.

FIG. 3A shows a multi-level table according to present invention embodiments. In a multi-level table, a single cell (in some cases, a hyper-cell) may represent the value of a single cell e.g., from a base-table, a combination of the values of multiple cells from a base-table, or may reference another level of a multi-level table. In this example, the full base-table 210 is shown, which represents a large data set with a large number of rows and columns. The values of multiple adjacent individual base cells 215—in this case, a block of six adjacent base cells—may be transformed into a single hyper-cell 225 as shown in hyper-table 220. This process may be repeated, e.g., for other blocks of six adjacent base cells, to create hyper-table 220 with a plurality of hyper-cells 225. Each hyper-cell 225 may represent a sub-table 230, which corresponds to the six base cells that were transformed to form the corresponding hyper-cell. Accordingly, the hyper-table 220 has fewer rows and/or columns than the base table. The user may view the values of the hyper-cells, which allows interpretation and visualization of the full data set, e.g., base-table 210. As the base-table data corresponding to the hyper-cell is preserved during the transformation of the base-table data, the hyper-cell may be extended to display the sub-level table 230 corresponding to the base-table data.

Figure 3B:
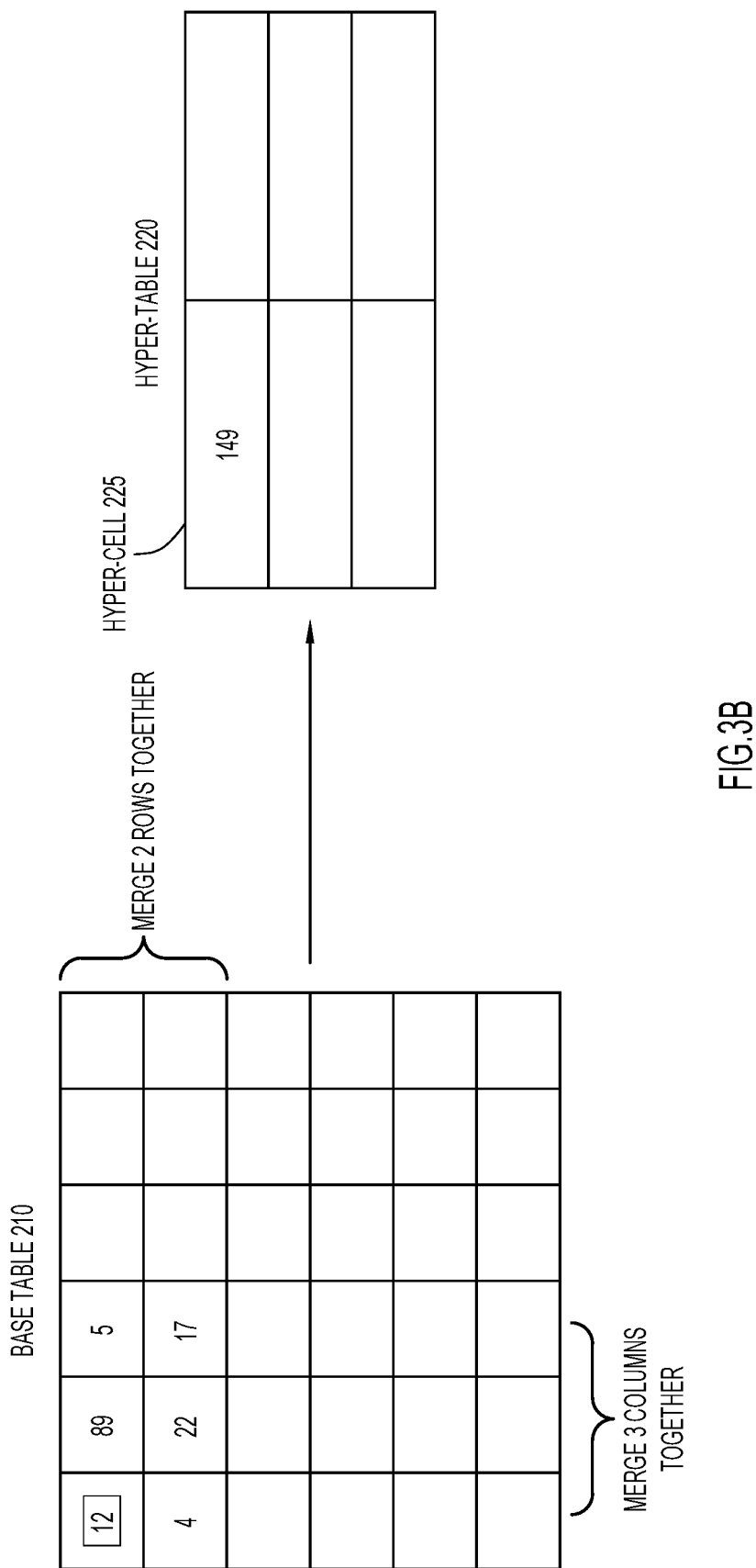

FIG. 3B shows a base table 210 in which a group of six base cells are transformed into a hyper-cell 225 of a hyper-table 220. In this example, the value of an individual cell in a base-table is the number of documents in which a first entity (row) and a second entity (column) are found within the same document across a population of documents. For example, referring back to FIG. 2A, the cell entry may reflect a co-occurrence rate or frequency of a pair of entities, e.g., a number of times that two different molecules appear in the same document for a plurality of documents. When a set of cells from the base-table are combined, the values of the base cells may be combined to generate a corresponding value for the hyper-cell. In this case, the values of the six cells may be summed to form a hyper-cell. The value of the hyper-cell corresponds to a co-occurrence frequency for a groups of row entities and column entities for a set of documents.

Figure 3C:
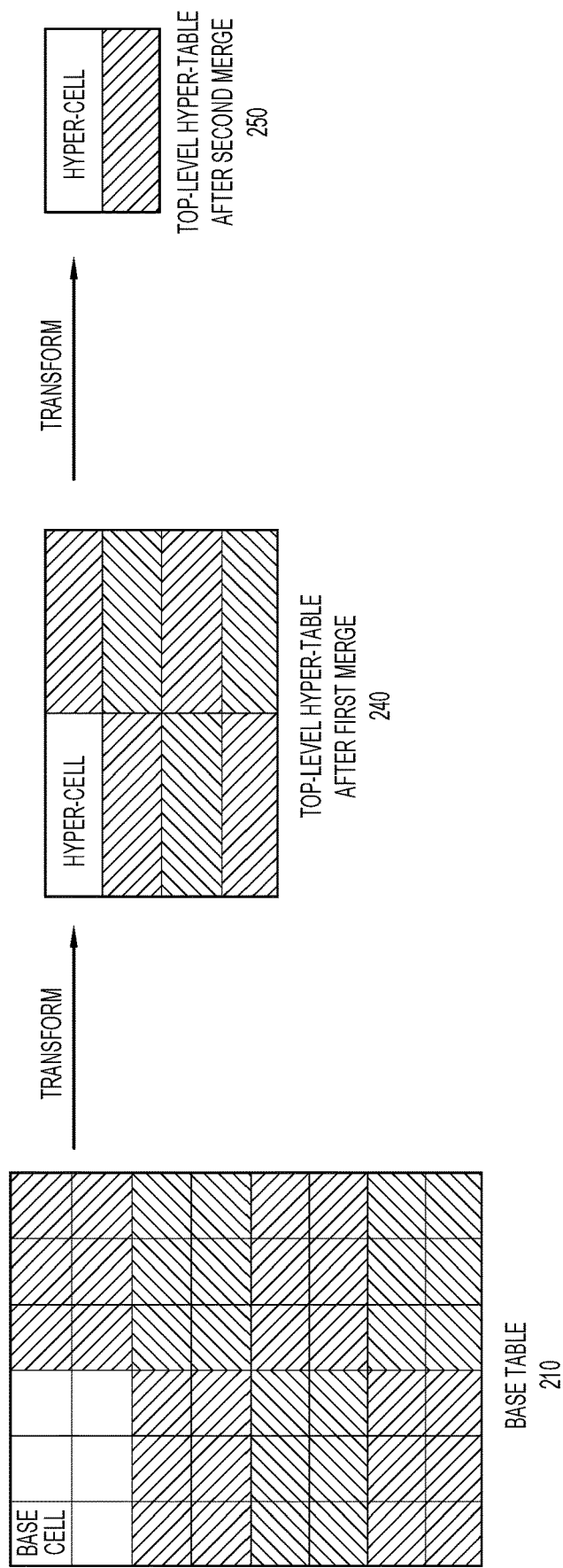

FIG. 3C shows an illustration of generating a hyper-table comprising at least one intermediate level. For example, groups of base cells 215 from the base-table may be transformed to form hyper-cells 225 of hyper-table 240. At this point in the transformation, selecting a hyper-cell 225 of hyper-table 240 displays a sub-table of the corresponding set of base cells 215.

To further reduce the size of the top-level table 240, groups of hyper-cells 225 may be further transformed to form multi-level table 250 having a first level and an intermediate or second level. In this case, sets of four hyper-cells of hyper-table 240 are transformed to form hyper-table 250, having two hyper-cells at the first or top level. Hyper-table 250 has two levels, such that extending a hyper-cell of the top or first level displays a corresponding second level hyper-table comprising four hyper-cells, and extending a hyper-cell of the second level hyper-table displays a corresponding sub-table of base cells.

Thus, a multi-level table may comprise any number of levels (e.g., a first level, a first level and any number of intermediate levels (e.g., a second level, a third level, a fourth level, a fifth level, etc.)). The dimensioning of the multi-level table (e.g., the number of base cells combined to form a hyper-cell, the number of hyper-cells of a respective level combined to form a hyper-table, etc.) may be set based on a determined size. Thus, a given hyper-cell may correspond to a sub-table of base cells, to a single base cell, or may be linked to an intermediate level comprising a hyper-table with at least one hyper-cell. Thus, the dimensions of the multi-level table may be configured based upon parameters leading to a determined size, which may be customized to any suitable size for display to a user.

Embodiments of the present invention may enable users to discover potential relationships between entities in large sets of data. By transforming rows and column entities into different groups, by hyper-cells and hyper-tables, the entire base table can be represented in a compact manner, allowing relationships between entities to be readily interpreted. Various techniques are presented in FIGS. 4A-4C for transforming entities, e.g., according to a common feature so that a hyper-cell represents a group of base-cells with a common feature. A user may select the respective transformation technique based upon the type of analysis to be performed, or a default transformation technique may be employed absent user input.

FIG. 4A shows a technique for transforming entities based on co-occurrence rates to identify high frequency correlations. The columns and/or rows of the entire base table may be ordered, e.g., from the highest number to the lowest number, so that high frequency correlations may be identified. For example, a row entity having a high co-occurrence rate with a column entity may be identified using this technique.

Once the documents have been sorted, adjacent rows or columns having a high number (e.g., a number exceeding a predetermined threshold) may be combined to form hyper-cells having a corresponding high number, instead of mixing cells with high values with cells with low values, which may mask high frequency correlations in the multi-level table. In the example provided in FIG. 4A, groups of entities having a high co-occurrence rate may be identified at the top level of the multi-level table using this technique.

In some aspects, the base table data may be sorted using a frequency correlation technique to group cells having high correlations, and the multi-level table may be generated using the sorted data.

FIG. 4B shows a technique for transforming entities by their ontology (or category) to identify high frequency correlations between ontologies of entities. Each entity in the base-table may belong to an ontology, or in some cases, multiple ontologies. In some aspects, the ontology may be hierarchical. The entity names and their corresponding ontologies may be stored in database 30, accessible by the system described herein. Using this technique, row-based base-cells belonging to a first ontology may be grouped together and column-based base-cells belonging to a second ontology may be grouped together and transformed into a single hyper-cell. The hyper-cells of the hyper-table represent relationships between ontologies, and the corresponding ontology name may be used as the row/column name in the corresponding hyper-table, which shows ontology co-occurrence of the large data set. This technique may be used to identify novel relationships or confirm known relationships based on a co-occurrence rate of two categories of entities.

For example, in FIG. 4B, base table 420 shows a plurality of rows and a plurality of columns, each corresponding to an entity. After grouping based on ontology, relationships between diseases such as cardiac disease and diabetes may be evaluated with respect to categories of molecules, as shown in hyper-table 430. In some cases, novel relationships between ontologies may be determined by transforming the entities into an ontology-based hyper-table.

For generating hyper-cells based on ontology, the system may contain an ontology (e.g., a hierarchical ontology, a non-hierarchical ontology, etc.) determining which entities may be combined into a particular category. For a hierarchical ontology, the system may combine entities at a particular level of an ontology to see if an appropriate hyper-table dimension is met, and if not, may add another level to the multi-level table to meet desired dimensions.

In some aspects, the base table data may be grouped or sorted using an ontology technique to group cells within a particular ontology, or at a level of a hierarchical ontology, and the multi-level table may be generated based on this sorted data. These techniques allow novel correlations to be discovered between categories.

FIG. 4C shows a technique for grouping entities by one or more similarity metrics to identify high frequency correlations. A cognitive drug discovery module (e.g., using a predictive analytics (PA) module, and not shown in FIG. 1) may calculate one or more similarity metrics between a set of entities using one or more similarity techniques. For example, a PA module may be used to calculate a similarity score (e.g., a drug similarity, a chemical similarity, etc.) for the row entities and for the column entities. Row entities and column entities having the same similarity score or a similarity score within a threshold may be combined into a single hyper-cell. For example, FIG. 4C shows three molecules (e.g., KRAS, ATM and PIK3CA) having the same similarity score 440, and are therefore combined into hyper-cells as shown in hyper-table 450. Similarly, SMAD4 and SOX9 have the same similarity score and are combined into hyper-cells. This technique may be used with cognitive analytics programs, in which similarity scores between entities are computed and used to transform entities.

For generating hyper-cells based on similarity, parameters are provided to the system determining a level of similarity (e.g., wherein a level of similarity is determined based on a threshold value, a percentage, etc.) between entities. If multiple types of similarity scores are available, the system may be configured to select a single similarity score or a weighted combination of similarity scores in order to combine entities to generate hyper-cells.

Data pertaining to the identification of novel relationships may be stored in entity relationship data module 36.

In some aspects, the base table data may be grouped or sorted based on one or more similarity metrics, and the multi-level table may be generated based on this grouped data. These techniques allow novel correlations to be discovered between entities.

Figure 5A:
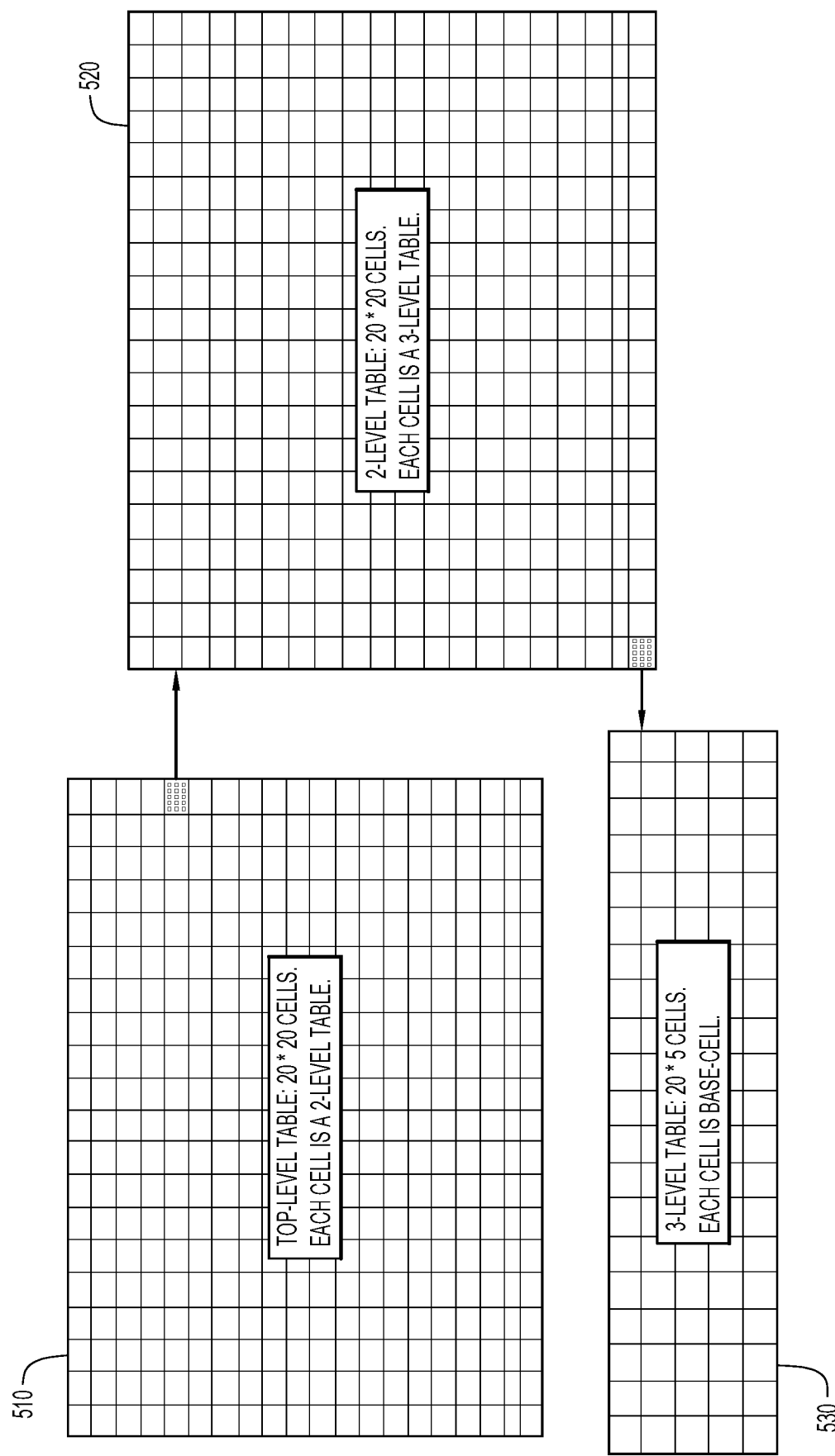
FIGS. 5A-5C are additional examples of graphical illustrations of generating multi-level tables in accordance with embodiments of the present disclosure.
Figure 5C:
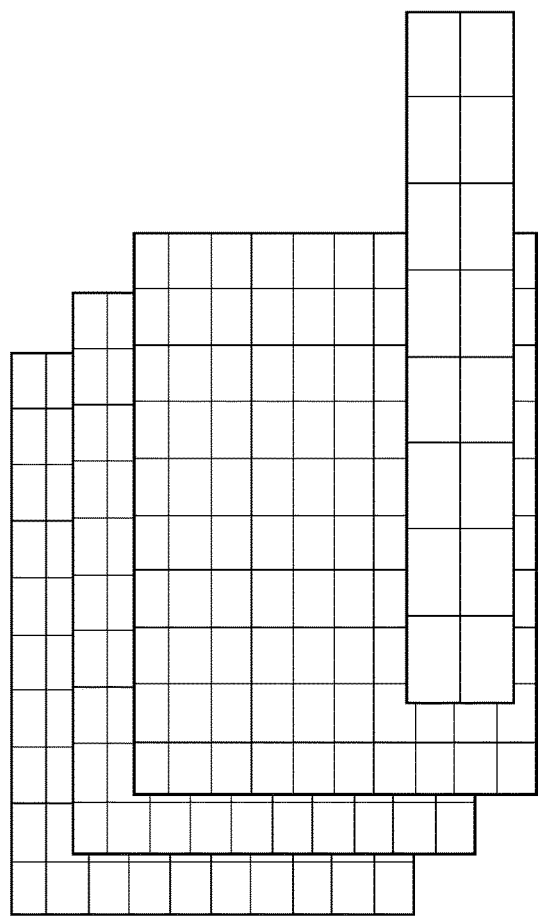
Figure 5B:
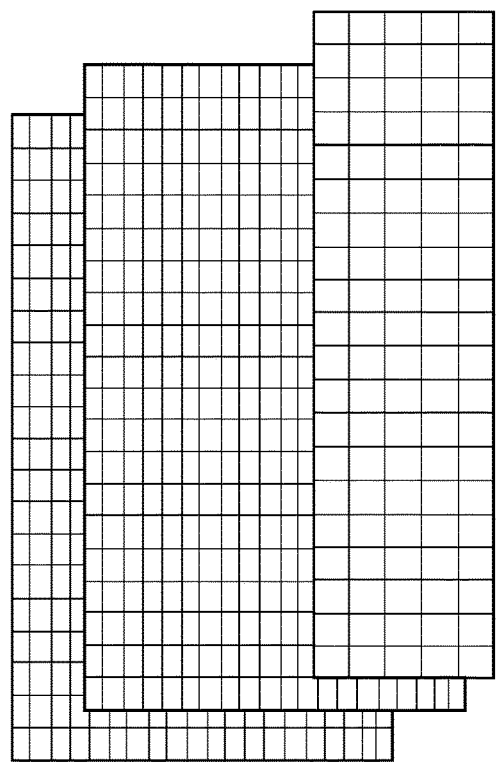

FIGS. 5A and 5B cover aspects of determining dimensions of hyper-tables and sub-tables of a multi-level table. For large base-tables, rows and columns may be merged multiple times to achieve hyper-tables of a suitable size. For example, for a base-table of 8000 rows and 2000 columns, and assuming a limit is set of 20 rows and 20 columns for a level of the hyper-table, then the system 15 may generate a hyper-table as follows:

Base-level table: 8000*2000
Hyper-table after first merge: 400*100
Hyper-table after second merge: 20*5

To generate a suitably sized multi-level table, a top or first level table (20 rows and 20 columns) is generated, wherein each hyper-cell is linked to a second level hyper-table (a hyper-table also having 20 rows and 20 columns). Each hyper-cell from the second level hyper-table is linked to base-table data (a sub-table of 20 rows and 5 columns). Thus, a user clicking on a hyper-cell of the top level table perform two expansions to reach base-table data.

FIG. 5B shows additional examples of different dimensions for a multi-level table. A user may change the hyper-table size and the number of levels until achieving a desired size. For example, for a base-table of 8000 rows and 2000 columns, setting the hyper-table size to 20 rows and 20 columns, generates a multi-level table having three levels, with the base level having 20 rows and 5 columns, as shown in FIG. 5B. Similarly, for a base-table of 8000 rows and 2000 columns, setting the hyper-table size to 10 rows and 10 columns, generates a multi-level table having 4 levels, with the base level having 8 rows and 2 columns, as shown in FIG. 5C.

Figure 6:
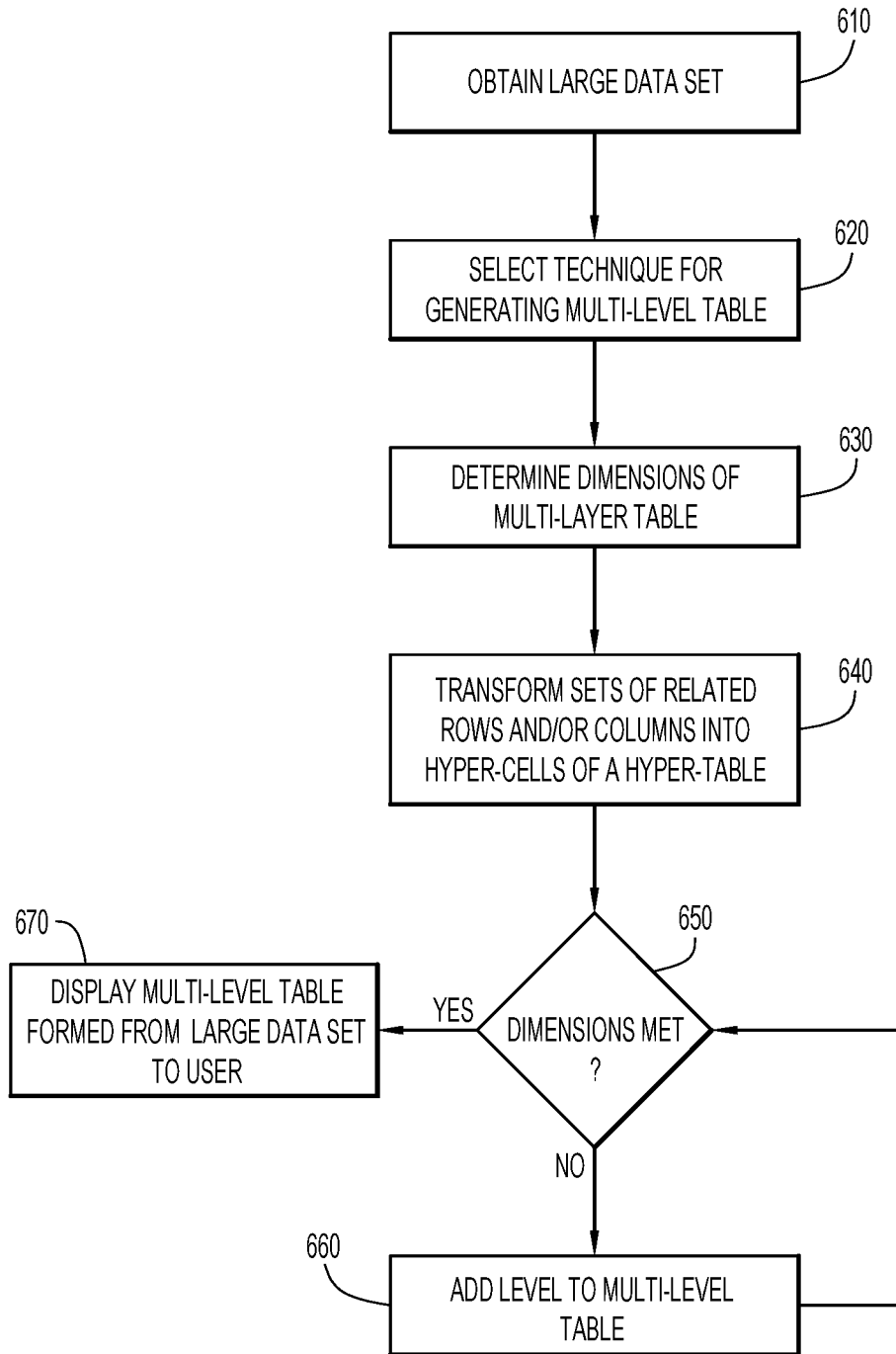
FIG. 6 is a flowchart of an example computer-implemented method of generating multi-level tables in accordance with embodiments of the present disclosure.

FIG. 6 shows a flowchart of example operations of cognitive system 15 generating a multi-level table. At operation 610, a large data set is obtained. At operation 620, a user selects a technique for generating the multi-level table. For example, the user may select a sorting technique, an ontology technique, a similarity technique (see, e.g., FIGS. 4A-4C), or any other suitable technique for transforming data. At operation 630, the system determines dimensions of a level of the multi-level table based on size parameters. For example, a user may input parameters for a hyper-table, e.g., a maximum of 20 rows and 20 columns, and the system may utilize this requirement to meet the desired dimensions. At operation 640, sets of related rows and/or columns (cells) are transformed into hyper-cells of a hyper-table. At operation 650, the system determines if the requested dimensions have been met. If the size of the multi-level table is too large, the system may add another level (another hyper-table) to the multi-level table at operation 660, and then re-evaluates as to whether the desired dimensioning has been met at operation 650. If dimensions have been met, the multi-level table is displayed to the user at operation 670. The user may then select a hyper-cell at the top-level of the hyper-table to expand the hyper-cell, and may navigate through one or more levels of hyper-cells until reaching the base-table (terminal level) data.

In general, each table of the first and intermediate levels of the multi-level table includes a desired size less than a size of the initial base table and each table of the terminal level includes a size less than the size of a linked table of the prior level.

Figure 7:
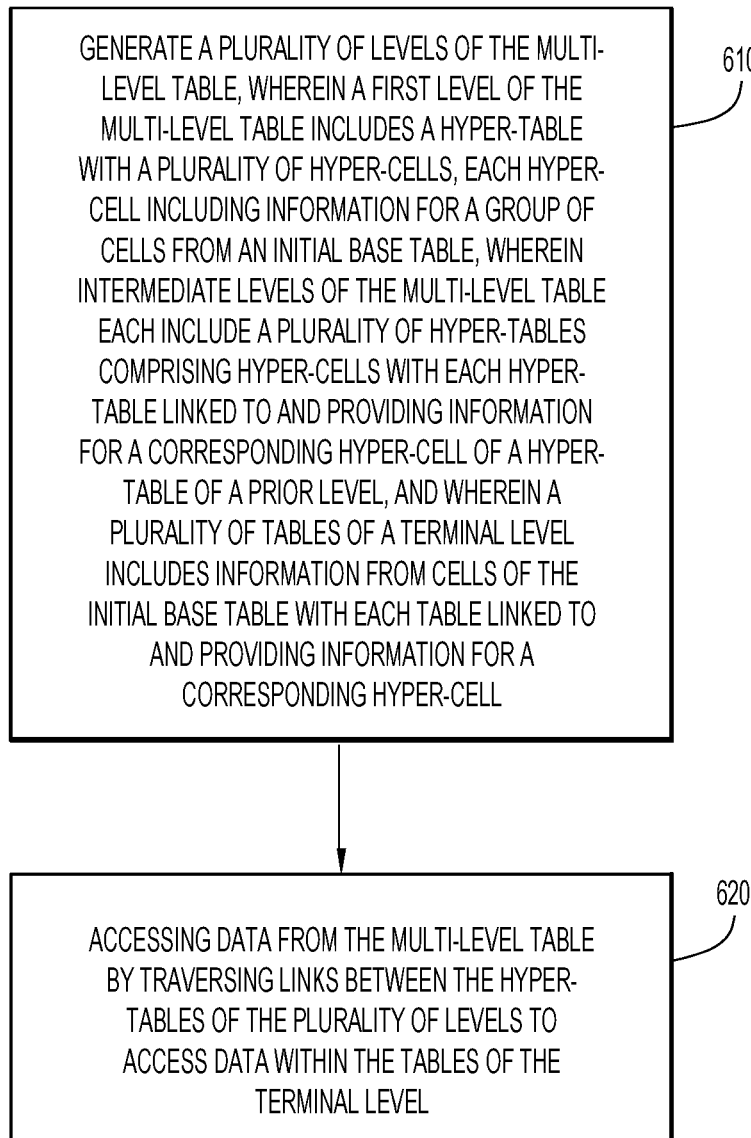
FIG. 7 is a high level flowchart of an example computer-implemented method of generating multi-level tables in accordance with embodiments of the present disclosure.

FIG. 7 shows a flowchart of example operations at a high level of generating a multi-level table. According to operation 710, a plurality of levels of the multi-level table are generated, wherein a first level of the multi-level table includes a hyper-table with a plurality of hyper-cells each hyper-cell including information for a group of cells from an initial base table, wherein intermediate levels of the multi-level table each include a plurality of hyper-tables comprising hyper-cells with each hyper-table linked to and providing information for a corresponding hyper-cell of a table of a prior level, and wherein a plurality of tables of a terminal level includes information from cells of the initial base table, with each table linked to and providing information for a corresponding hyper-cell. Thus, for a multi-level table with N levels, the Nth level may be a terminal level, and the (N−1)th level may comprise hyper-cells corresponding to the tables of the terminal level. According to operation 620, data from the multi-level table may be accessed by traversing links between the hyper-tables of the plurality of levels to access data within the tables of the terminal level.

Advantages of present techniques include the ability to represent the characteristics of a large set of data using a concise, accessible format. For example, at the top level of a multi-level table, the characteristics of the entire set of data may be compactly represented. For numerical data, a user may easily identify top-level hyper-cells having large values, and may navigate through the linked information (e.g., clicking on a hyper-cell linked to another hyper-tables, and so forth, until reach the base table data) to identify the underlying cells comprising high values within the base table. Accordingly, a user does not need to navigate through the entire the hyper-table to identify such information, unlike a spreadsheet.

In some cases, various sorting and classification algorithms may be used to improve the results of the grouping of cells into hyper-cells to ensure that grouping does not artificially inflate or deflate bulk characteristics of the grouped data. In other cases, grouping based on an ontology or similarity metric may be used to identify novel relationships between categories and/or entities.

It will be appreciated that the embodiments described above and illustrated in the drawings represent only a few of the many ways of implementing embodiments for transforming large data sets into multi-level tables.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, cognitive module 15 and corresponding submodules, etc.). These systems may include any types of monitors and input devices (e.g., keyboard, mouse, voice recognition, etc.) to enter and/or view information.

It is to be understood that the software (e.g., cognitive system 15, hyper-table and hyper-cell configuration module 105, sorting grouping module 115, ontology grouping module 125, and similarity grouping module 135, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., cognitive system 15, hyper-table and hyper-cell configuration module 105, sorting grouping module 115, ontology grouping module 125, and similarity grouping module 135, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data set 32, hyper-table and hyper-cell parameters 34, entity relationship data 36, etc.). The database system may be implemented by any number of any conventional or other databases, data stores or storage structures (e.g., files, databases, data structures, data or other repositories, etc.) to store information (e.g., data set 32, hyper-table and hyper-cell parameters 34, entity relationship data 36, etc.). The database system may be included within or coupled to the server and/or client systems. The database systems and/or storage structures may be remote from or local to the computer or other processing systems, and may store any desired data (e.g., data set 32, hyper-table and hyper-cell parameters 34, entity relationship data 36, etc.).

The present invention embodiments may employ any number of any type of user interface (e.g., Graphical User Interface (GUI), command-line, prompt, etc.) for obtaining or providing information (e.g., data set 32, hyper-table and hyper-cell parameters 34, entity relationship data 36, etc.), where the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The multi-level table may include any information arranged in any fashion, and may be configurable based on rules or other criteria to provide desired information to a user (e.g., entity grouping, entity relationships, etc.).

The present invention embodiments are not limited to the specific tasks or algorithms described above, but may be utilized for any large set of data in which analysis of the data is needed. In some aspects, the data may be numerical, in other aspects, the data may be binary, and in still other aspects, the data may be text-based. The data may represent biological data, chemical data, medical data, etc. In other aspects, the data may be from other scientific or technical disciplines, legal or governmental disciplines in which correlations between entities in large set of data, arranged in a table or other format that conveys co-occurrence, of at least two entities is desired.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for accessing data in a multi-level table, the system comprising at least one hardware processor configured to: generate the multi-level table to represent a dataset on a user interface by generating a plurality of levels of the multi-level table, wherein the multilevel table includes: a top level including a hyper-table with a plurality of hyper-cells, each hyper-cell linked to, and including a value determined by combining values from, a group of corresponding hyper-cells of a hyper-table of a prior intermediate level of the multi-level table; one or more intermediate levels each including a hyper-table comprising hyper-cells each linked to, and including a value determined by combining values from, a group of corresponding hyper-cells of a hyper-table of a prior level of the multi-level table; and a terminal level including a hyper-table including hyper-cells each linked to, and including a value determined by combining values from, a group of corresponding cells from an initial base table including the dataset; navigate the multi-level table and access data from the multi-level table by selecting hyper-cells of the plurality of levels on the user interface and traversing links of the selected hyper-cells; and display on the user interface the group of corresponding cells or hyper-cells linked to a selected hyper-cell of the plurality of levels.

2. The system of claim 1, wherein each hyper-table of the top and intermediate levels of the multi-level table includes a desired size less than a size of the initial base table and the hyper-table of the terminal level includes a size less than the size of a linked table of the prior level.

3. The system of claim 1, wherein each cell of the initial base table includes information pertaining to co-occurrence of entities of an associated row and column within the same documents.

4. The system of claim 1, wherein each cell of the initial base table includes information pertaining to entities, and wherein the at least one hardware processor is further configured to:
   generate a plurality of levels by sorting the cells of the initial base table based on the entity information and grouping adjacent sorted cells of the initial base table to form the corresponding hyper-cell of the hyper-table of another level.

5. The system of claim 4, wherein the cells of the initial base table are sorted based on frequency of co-occurrence of a first entity and a second entity, and wherein the at least one hardware processor is further configured to identify novel relationships between the groups of cells.

6. The system of claim 1, wherein each cell of the initial base table includes information pertaining to entities, and wherein the at least one hardware processor is further configured to generate a plurality of levels by grouping cells of the initial base table to form the corresponding hyper-cell of the hyper-table of another level based on ontologies associated with entities pertaining to those cells.

7. The system of claim 6, wherein the ontology is a hierarchical ontology, and wherein the at least one hardware processor is further configured to:
   group the cells of the initial base table into one or more hyper-cells according to a level of the ontology; and
   identify new relationships between the groups of cells.

8. The system of claim 1, wherein each cell of the initial base table includes information pertaining to entities, and wherein the at least one hardware processor is further configured to generate a plurality of levels by grouping cells of the initial base table to form the corresponding hyper-cell of the hyper-table of another level based on similarity of entities pertaining to those cells.

9. The system of claim 8, wherein multiple similarity measures are provided, and wherein the at least one hardware processor is further configured to:
   group cells of the initial base table into one or more hyper-cells using a weighted combination of the similarity measures; and
   identify new relationships between the groups of cells.

10. A computer program product for generating a multi-level table, the computer program product comprising one or more non-transitory computer readable storage media collectively having program instructions embodied therewith, the program instructions executable by a processor to: generate the multi-level table to represent a dataset on a user interface by generating a plurality of levels of the multi-level table, wherein the multi-level table includes: a top level including a hyper-table with a plurality of hyper-cells, each hyper-cell linked to, and including a value determined by combining values from, a group of corresponding hyper-cells of a hyper-table of a prior intermediate level of the multi-level table; one or more intermediate levels each including a hyper-table comprising hyper-cells each linked to, and including a value determined by combining values from, a group of corresponding hyper-cells of a hyper-table of a prior level of the multi-level table; and a terminal level including a hyper-table including hyper-cells each linked to, and including a value determined by combining values from, a group of corresponding cells from an initial base table including the dataset; navigate the multi-level table and access data from the multi-level table by selecting hyper-cells of the plurality of levels on the user interface and traversing links of the selected hyper-cells; and display on the user interface the group of corresponding cells or hyper-cells linked to a selected hyper-cell of the plurality of levels.

11. The computer program product of claim 10, wherein each hyper-table of the top and intermediate levels of the multi-level table includes a desired size less than a size of the initial base table and the hyper-table of the terminal level includes a size less than the size of a linked table of the prior level.

12. The computer program product of claim 10, wherein each cell of the initial base table includes information pertaining to entities, and wherein the program instructions executable by the processor further include instructions to:
   generate a plurality of levels by sorting the cells of the initial base table based on the entity information and grouping adjacent sorted cells of the initial base table to form the corresponding hyper-cell of the hyper-table of another level, wherein the cells of the initial base table are sorted based on frequency of co-occurrence of a first entity and a second entity, and wherein the program instructions executable by the processor further include instructions to identify novel relationships between the groups of cells.

13. The computer program product of claim 10, wherein each cell of the initial base table includes information pertaining to entities, and wherein the program instructions executable by the processor further include instructions to generate a plurality of levels by grouping cells of the initial base table to form the corresponding hyper-cell of the hyper-table of another level based on ontologies associated with entities pertaining to those cells.

14. The computer program product of claim 13, wherein the ontology is a hierarchical ontology, and wherein the program instructions executable by the processor further include instructions to:
   group the cells of the initial base table into one or more hyper-cells according to a level of the ontology; and
   identify new relationships between the groups of cells.

15. The computer program product of claim 10, wherein each cell of the initial base table includes information pertaining to entities, and wherein the program instructions executable by the processor further include instructions to generate a plurality of levels by grouping cells of the initial base table to form the corresponding hyper-cell of the hyper-table of another level based on similarity of entities pertaining to those cells.

16. The computer program product of claim 15, wherein multiple similarity measures are provided, and wherein the program instructions executable by the processor further include instructions to:
   group cells of the initial base table into one or more hyper-cells using a weighted combination of the similarity measures; and
   identify new relationships between the groups of cells.

* * * * *